United States Patent [19]

Bello

[11] Patent Number: 5,533,743
[45] Date of Patent: Jul. 9, 1996

[54] TOW BALL AND SHIN PROTECTOR

[76] Inventor: Louis Bello, 248 Manassas Dr., Manassas Pk., Va. 22111

[21] Appl. No.: 328,273

[22] Filed: Oct. 3, 1994

[51] Int. Cl.$^6$ .................................................. B60R 21/34
[52] U.S. Cl. ............................................ 280/507; 150/154
[58] Field of Search ........................... 280/507; 293/142; 150/154, 166

[56] References Cited

U.S. PATENT DOCUMENTS

| | | | |
|---|---|---|---|
| 3,596,926 | 8/1971 | Randall | 280/507 |
| 4,181,320 | 1/1980 | Wellborn, Jr. | 280/507 |
| 5,037,122 | 8/1991 | Beckerer, Jr. | 280/507 |

FOREIGN PATENT DOCUMENTS

| | | | |
|---|---|---|---|
| 2097306 | 3/1972 | France | 280/507 |

Primary Examiner—Andrew C. Pike

[57] ABSTRACT

A cushioning device, for a trailer hitch, includes an expandable opening capable of fitting onto a tow ball of a vehicle, with protrusions extending away from its body and toward nearby parts of the vehicle or the trailer hitch, exerting pressure against those parts, the rest of the body extending beyond all of the tow ball's outer perimeters thereby providing protection to passersby against accidental injury, enhanced visibility, and protective covering for the tow ball.

1 Claim, 1 Drawing Sheet

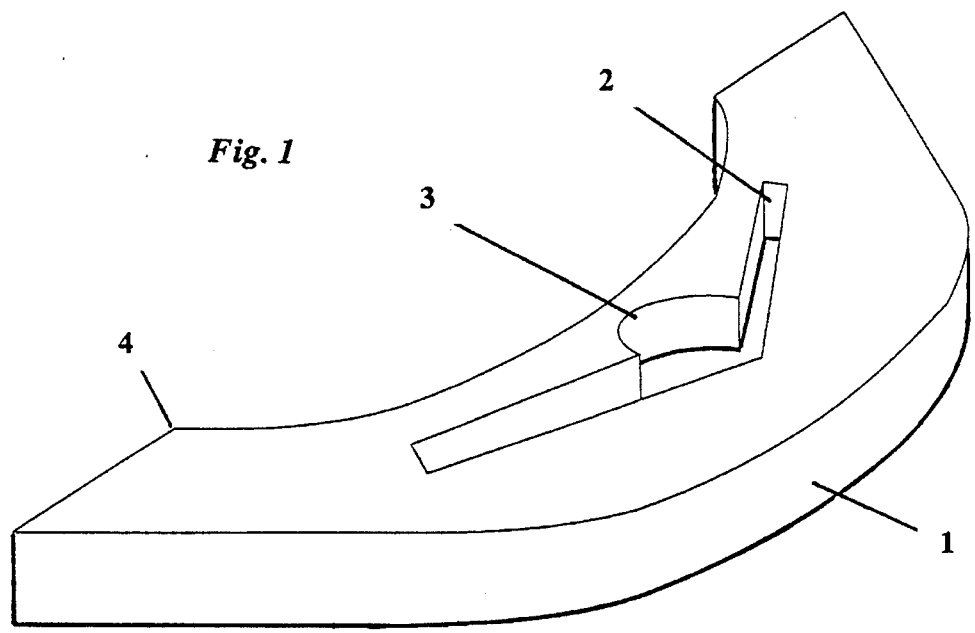
*Fig. 1*
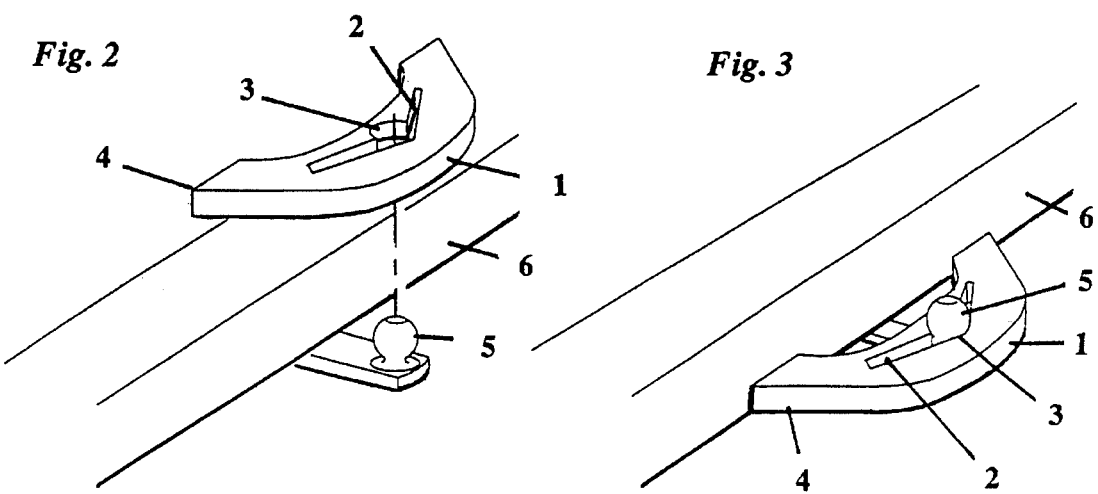
*Fig. 2*   *Fig. 3*

TOW BALL AND SHIN PROTECTOR

This invention relates generally to devices that protect a tow ball and at the same time protect personnel from accidental, injurious contact with the exposed parts of a vehicle's towing equipment when towing is not being performed.

BACKGROUND OF THE INVENTION

Description of the Prior Art

Trailer hitches of the ball type are often accidentally struck by passersby, causing painful injuries. Cumbersome, expensive devices have been created to preserve the tow ball, but none to fully protect persons from injury. There is a need for a fully effective, inexpensive device.

SUMMARY OF THE INVENTION

The invention is a body that is rubber. The body contains an expandable opening capable of fitting over a tow ball of a vehicle. Protrusions extending away from the body toward the vehicle exert pressure against the nearby parts of said vehicle. The body extends beyond the towing equipment's outer perimeters, thereby providing protection to passersby from accidental injury. Brightly imprinted, this device will embellish this otherwise unattractive area, while adding visibility.

It is therefore a principal object of the invention to provide cushioning for a towing device in order to prevent accidental injury by contact.

A further object of the device is to provide protective cover for a towing ball.

Still another object of the device is to attain greater visibility through the use of bright colors in order to further prevent accidental, possibly injurious contact.

Another object of the invention is to enhance the appearance of the towing area of the vehicle by the use of interesting colors and shapes.

BRIEF DESCRIPTION OF THE DRAWINGS

For further comprehension of the invention, and of the objects and advantages thereof reference will be had to the following description and accompanying drawings, and to the appended claims, in which the various novel features are more particularly set forth.

In the accompanying drawings, forming a material part of this disclosure:

In page 1 of 1:

FIG. 1 is an isometric representation of the device.

FIG. 2 shows the device poised to be positioned over the tow ball.

FIG. 3 shows the device in place, covering and protecting.

Referring to the drawings, there is shown the device and all its' parts. Feature 1 is the main body which is made of rubber. Feature 4 brings attention to the flexible protrusions or "legs" which will flex or bend in order to satisfy various different distances between a vehicles' bumper 6 and the tow ball 5. Feature 2 shows slots radiating from a centrally located opening 3 which will allow said opening to expand and receive the various tow ball sizes available.

DESCRIPTION OF THE PREFERRED EMBODIMENT

In operation, the device is positioned directly over the tow ball 5 with the protrusions 4 facing the bumper 6 and the opening (3) centered over the tow ball, then pressed down onto the neck or shank of the ball as illustrated on page 1 FIGS. 2 and 3. The towing ball is now protected from minor damage that is cushioned by the device, passersby are protected from injury from the accidental contact, and the area is more visible and enhanced by the coloring of the device.

While I have illustrated one possible embodiment of my invention, it is to be understood that I do not limit myself to the precise construction herein disclosed. Various changes and modifications may be made within the scope of the invention as defined in the appended claims.

Having thus described my invention, what I claim as new, and desire to secure by United States Letters Patent is:

1. A shock absorbing device comprising a body, an expandable opening in the body capable of fitting over a tow ball of a vehicle, and protrusions extending away from the body toward the vehicle which will exert pressure against nearby parts of the vehicle, wherein the body extends beyond the tow bar's outer perimeters thereby providing protection to passersby against accidental injury, enhanced visibility, and protective covering for the tow ball.

* * * * *